(12) United States Patent
Bossard et al.

(10) Patent No.: US 7,704,485 B1
(45) Date of Patent: Apr. 27, 2010

(54) SYSTEM AND METHOD FOR PROCESSING FUEL FOR USE BY A FUEL CELL USING A MICRO-CHANNEL CATALYTIC HYDROGEN SEPARATOR

(76) Inventors: Peter R. Bossard, 106 Railroad Dr., Ivyland, PA (US) 18974; Jacques Mettes, 106 Railroad Dr., Ivyland, PA (US) 18974

( * ) Notice: Subject to any disclaimer, the term of this patent is extended or adjusted under 35 U.S.C. 154(b) by 1044 days.

(21) Appl. No.: 11/341,541

(22) Filed: Jan. 27, 2006

Related U.S. Application Data

(63) Continuation-in-part of application No. 11/097,535, filed on Mar. 31, 2005, now Pat. No. 7,396,385.

(51) Int. Cl.
*C01B 3/26* (2006.01)
*C01B 3/24* (2006.01)
*C01D 7/00* (2006.01)
(52) U.S. Cl. .................... 423/651; 423/650; 429/210
(58) Field of Classification Search ............... 423/651
See application file for complete search history.

(56) References Cited

U.S. PATENT DOCUMENTS

| | | | |
|---|---|---|---|
| 5,614,001 A | 3/1997 | Kosaka et al. | 96/10 |
| 5,931,987 A * | 8/1999 | Buxbaum | 95/55 |
| 6,348,278 B1 * | 2/2002 | LaPierre et al. | 429/17 |
| 6,436,354 B1 * | 8/2002 | Priegnitz et al. | 422/198 |
| 6,830,842 B2 * | 12/2004 | Siepierski et al. | 429/17 |

* cited by examiner

*Primary Examiner*—Melvin C Mayes
*Assistant Examiner*—Kenneth Vaden
(74) *Attorney, Agent, or Firm*—LaMorte & Associates

(57) ABSTRACT

A power generation system and a fuel processor for use within a power generation system. A common hydrocarbon fuel is introduced into the heated reaction chamber along with water vapor. The hydrocarbon fuel and water react, producing less complex resultant gases. The resultant gases are passed into a hydrogen separator. The hydrogen separator separates hydrogen from the resultant gases. The separated hydrogen is used to power a fuel cell. The fuel cell produces electricity and water that can be recycled back into the system. A standard hydrocarbon fuel can therefore be used to power a fuel cell in a highly efficient, singe-step process.

7 Claims, 3 Drawing Sheets

SYSTEM AND METHOD FOR PROCESSING FUEL FOR USE BY A FUEL CELL USING A MICRO-CHANNEL CATALYTIC HYDROGEN SEPARATOR

RELATED APPLICATIONS

This application is a continuation-in-part of U.S. patent application Ser. No. 11/097,535, filed Mar. 31, 2005 entitled, System And Method For Efficiently Separating Hydrogen Gas From A Mixed Gas Source, now U.S. Pat. No. 7,396,385.

BACKGROUND OF THE INVENTION

1. Field of the Invention

The present invention relates to systems and methods that are used to separate molecular hydrogen from a volume of gas. More particularly, the present invention is related to systems and methods that separate hydrogen from a volume of mixed gas and utilize the hydrogen as fuel for a fuel cell.

2. Prior Art Description

In industry, there are many applications for the use of ultra pure molecular hydrogen. For instance, there are many fuel cells that operate using hydrogen. The hydrogen, however, must be ultra pure. Any molecules of carbon dioxide, carbon monoxide or other contaminant gases that are received by the fuel cell either reduces its efficiency or causes damage to the fuel cell.

Hydrogen gas does not exist naturally on earth to any significant extent because it reacts with many elements and readily combines to form compounds. Hydrogen gas must therefore be manufactured. Hydrogen gas can be manufactured in a number of ways. For instance, hydrogen gas can be created by splitting water molecules through electrolysis. However, the power needed for electrolysis is always greater than the powered available from a fuel cell that utilizes the output hydrogen gas from the electrolysis. Any fuel cell system that obtains hydrogen gas from electrolysis therefore results in a net power loss.

Most commonly, the purified hydrogen that is used by a fuel cell is generated by obtaining hydrogen gas from a hydrocarbon, using a multi-stage process. In industry, hydrogen gas is most often obtained by breaking down either fossil or biofuels, both of which are in the general class of hydrocarbons. In a first stage, a hydrocarbon such as gasoline, methane, diesel or other hydrocarbons which have the form $C_nH_{(2n+2)}$ is broken down to less complex molecules. When such hydrocarbons are broken down, hydrogen gas is liberated from the hydrocarbon. The breaking down the hydrocarbons to generate hydrogen has been done for approximately 100 years. During this time frame the general process has remained the same and it is based on equilibrium reactions. The general process for breaking down hydrocarbons involves a high temperature cracking of the hydrocarbon fuel, a lower temperature water gas shift reaction to increase the concentration of hydrogen and then a separation of the hydrogen. The hydrogen must then be purified in a secondary process to achieve the desired level of purity. Such prior art industrial processes typically require millions of dollars in equipment and building sized facilities. It is therefore expensive to create extremely pure hydrogen gas. Accordingly, if hydrogen gas is used as a direct source of energy, it is one of the most uneconomical fuels that can be used without the invention described in this patent application.

One of the few places that hydrogen gas is used as a fuel is in a proton exchange membrane (PEM) fuel cell. A PEM fuel cell only utilizes hydrogen gas that has been processed to extreme levels of purity. In many common processes that produce hydrogen, the hydrogen gas produced by that process is not pure enough to be used directly by the PEM fuel cell. Rather, when hydrogen is produced, the resultant gas is often contaminated with water vapor, hydrocarbons and/or other contaminants. It is for this reason that once hydrogen gas is generated, it must be purified in a second processing stage. The cost of this processing depends on the level of purity required. The purer the hydrogen gas, the greater the time, money and energy are required.

In the art, ultra pure hydrogen is commonly considered to be hydrogen having purity levels of at least 99.999%. In the prior art, one of the most common ways to purify contaminated hydrogen gas is to pass the gas through a conduit made of a hydrogen permeable material, such as palladium or a palladium alloy. As the contaminated hydrogen gas passes through the conduit, atomic hydrogen permeates through the walls of the conduit, thereby separating from the contaminants. In such prior art processes, the conduit is kept internally pressurized and is typically heated to at least three hundred degrees centigrade. Within the conduit, molecular hydrogen disassociates into atomic hydrogen on the surface of the conduit and the conduit absorbs the atomic hydrogen. The atomic hydrogen permeates through the conduit from a high pressure side of the conduit to a low pressure side of the conduit. Once at the low pressure side of the conduit, the atomic hydrogen recombines to form molecular hydrogen. The molecular hydrogen that passes through the walls of the conduit can then be collected for use. Such prior art systems are exemplified by U.S. Pat. No. 5,614,001 to Kosaka et al., entitled Hydrogen Separator, Hydrogen Separating Apparatus And Method For Manufacturing Hydrogen Separator.

In the past, fuel cells have mostly been used to power exotic devices, such as spacecraft. Accordingly, the cost of operating a two stage system for obtaining purified hydrogen is of little concern. However, if fuel cells are to be used to power more traditional devices, such as automobiles, cost is one of the most important design criteria. It is primarily the cost associated with using hydrogen that have prevented fuel cell technology from spreading into traditional consumer products.

Consider an automobile. In order to use a fuel cell in an automobile, hydrogen gas would have to be separated from a source gas at some processing plant. The hydrogen gas would then be purified in an expensive secondary process. The purified hydrogen, as a gas or liquid, would then be shipped under some pressure to gas stations for storage. The high pressure hydrogen would then have to be pumped at even high pressures into the automobile for storage. Within the automobile, the high pressure hydrogen would then have to be dropped to near atmospheric levels prior to its use by the fuel cell. This fueling scenario requires pressurized tanks to be maintained both at the gas station and within the automobile. It also requires pumping lines and couplings for fueling the automobile that can hold hydrogen gas under immense pressure. The dangers and cost of refueling alone have long been deterrents to producing any vehicle that runs on hydrogen.

A long-standing need, therefore, exists for an integrated compact fuel processing system, wherein a traditional fuel, such as diesel or gasoline, can be pumped into the gas tank of an automobile or a ship in the ordinary manner. A fuel processing system carried within the automobile or ship will then obtain ultra pure hydrogen from that traditional fuel using an integrated process that operates on an as-needed basis. The ultra pure hydrogen can then be used to power a fuel cell for the production of electricity.

This need is met by the present invention as described and claimed below.

SUMMARY OF THE INVENTION

The present invention is a system that converts hydrocarbons, such as petrochemicals, alcohols, and ammonia into a stream of pure hydrogen and a waste stream of $CO_2$ and $H_2O$. The pure hydrogen is produced on an as-needed basis to power a proton exchange membrane (PEM) fuel cell.

A common hydrocarbon fuel is introduced into the heated reaction chamber along with water vapor. The hydrocarbon fuel and water undergo steam reforming where they react in a water gas shift reaction, producing less complex resultant gases. The water gas shift reaction is optimized to maximize the concentration of hydrogen in the resultant gas stream.

The resultant gases include hydrogen gas and contaminant gases, such as carbon dioxide, carbon monoxide and methane. The resultant gases are hot and are passed directly are passed into a hydrogen separator. A preferred hydrogen separator is either a micro-channel hydrogen separator or a composite hydrogen separator. The selected hydrogen separator separates the hydrogen gas from the contaminant gases while reacting carbon monoxide to carbon dioxide and converting methane to carbon monoxide and then to carbon dioxide and hydrogen gas. Once reacted, nearly all the hydrogen gas separated from the waste stream gases. The hydrogen gas is ultra pure and the waste stream gases are almost entirely water and CO2 with very little energy content. The extremely pure hydrogen gas is used to power a fuel cell in what is call a dead end manner, which is the most efficient way to feed hydrogen to a PEM fuel cell. The fuel cell produces electricity and water that can be recycled back into the system.

This power generation system takes ordinary hydrocarbon fuel and converts nearly all of the chemical energy in the hydrocarbon fuel into purified hydrogen gas. The purified hydrogen gas powers a fuel cell that produces electricity. A standard hydrocarbon fuel can therefore be used as the source of the hydrogen that the above integrated single-step fuel processing system uses to generate extremely pure hydrogen that can be used to directly power a fuel cell. This integrated single-step fuel processing system is in highly compact and operates with high efficiency by transferring nearly all the fuels chemical energy to pure hydrogen.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

The present invention fuel system and method provides a highly efficient means for converting a hydrocarbon fuel, directly into ultra pure hydrogen on an as-needed basis. The ultra-pure hydrogen is then used to power a fuel cell for the production of electricity.

Figure 1:
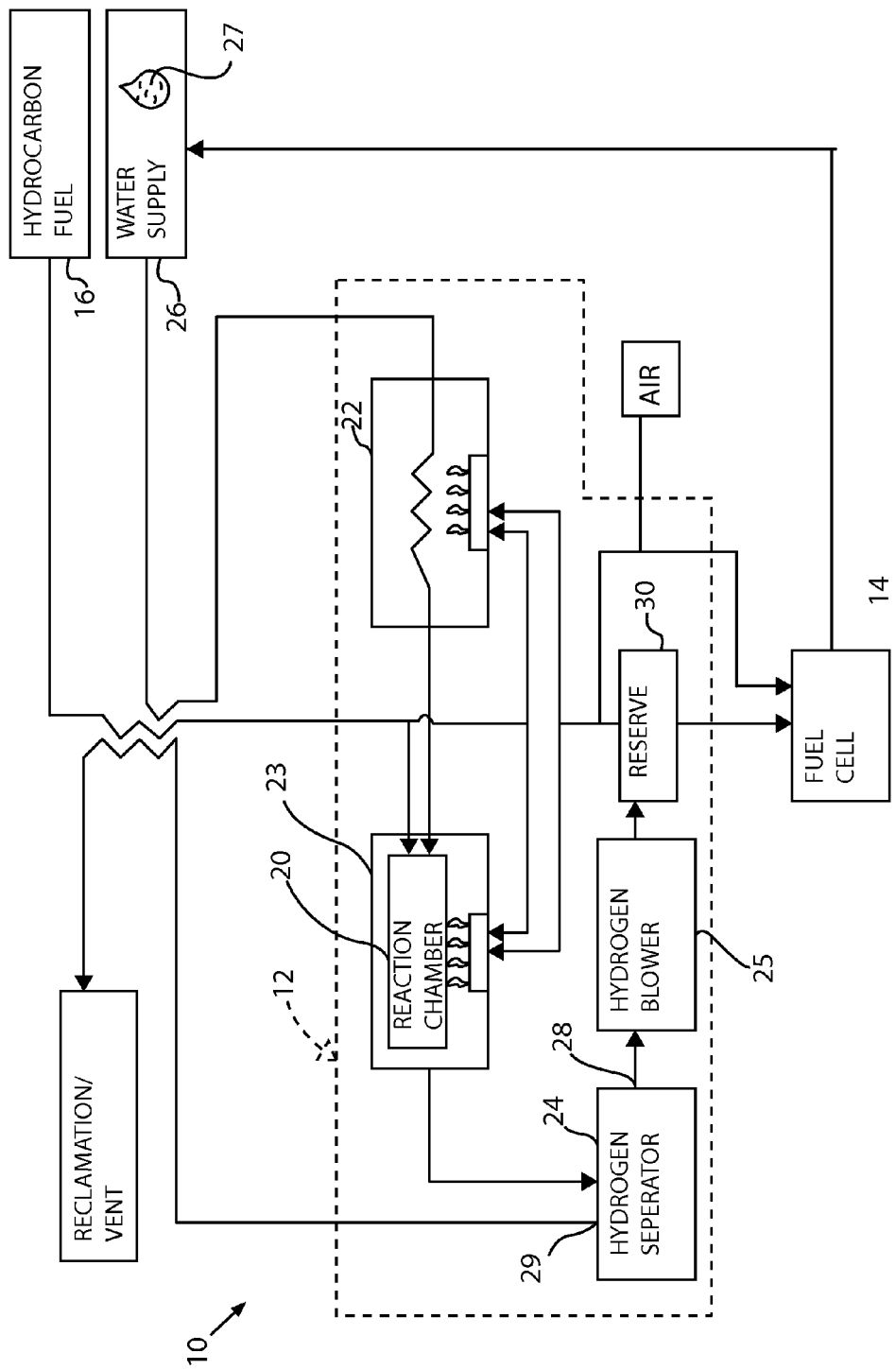
FIG. 1 is a schematic of an exemplary embodiment of a power generating system containing a fuel processor in accordance with the present invention.

Referring to FIG. 1, there is shown a schematic of an exemplary embodiment of a power generation system 10 that contains a fuel processor 12 and a fuel cell 14. The fuel processor 12 converts a hydrocarbon fuel 16 into ultra pure hydrogen that is then used to run the fuel cell 14.

The fuel cell 14 receives ultra pure hydrogen from the fuel processor 12 and produces electricity. There are several prior art fuel cell designs that require ultra pure hydrogen for proper operation. Such fuel cells are typically proton exchange membrane (PEM) fuel cells. Any such PEM fuel cell can be adapted for use as part of the overall power generation system 10.

The fuel processor 12 is comprised primarily of a reaction chamber 20, combustion heaters 22, 23 and a hydrogen separator 24. A traditional hydrocarbon fuel 16 is provided to the fuel processor 12. The hydrocarbon fuel 16 can be in either liquid or gas form. The hydrocarbon fuel 16 contains some type of primary hydrocarbon that is dependent upon the type of hydrocarbon fuel 16 being used. The hydrocarbon fuel can be a petrochemical, biofuel, alcohol, ammonia, or a natural fuel gas, such as methane or propane. The hydrocarbon contained within the hydrocarbon fuel 16 is represented by the formulation $C(n)H(m)$ where (n) is the number of carbon atoms in the hydrocarbon and (m) is the number of hydrogen atoms in the hydrocarbon. For pure hydrocarbons, such as propane or methane, the hydrocarbon formulation is $C(n)H(n+2)$.

A water supply 26 is provided. The water supply 26 feeds water 27 to the fuel processor 12. The water 27 in the water supply 26 is replenished by the power generation system 10 as will later be explained. The water 27 supplied to the fuel processor 12 is initially heated by the first combustion heater 22. The first combustion heater 22 heats the incoming water 27 into a hot vapor. The fuel used to heat the water is created either by the burning of the hydrocarbon fuel 16 and/or hydrogen gas, as will later be explained.

The heated water vapor is introduced into a reaction chamber 20. A hydrocarbon fuel 16 is also introduced into the reaction chamber 20. The hydrocarbon fuel 16 and water vapor are received in the controlled amounts dictated by Equation 1 below. The reaction chamber 20 is heated by the second combustion heater 23 to between 650° C. and 800° C. In this temperature range, the water ($H_2O$) is a superheated vapor. Furthermore, any complex hydrocarbons present in the hydrocarbon fuel 16 are heat cracked into simpler molecules. These simpler molecules react with the water vapor in a water gas shift reaction. The water gas shift reaction is expressed in Equation 1 below.

$$C(n)H(m)+2(n)H_2O \rightarrow (n)CO_2+[2(n)+(m/2)]H_2 \qquad \text{Equation 1}$$

It will be understood that surplus water ($H_2O$) can be added to the to the reaction of Equation 1. The excess water helps in the reaction. However, excess water entered into the reaction is retrieved as excess water from the reaction and does not result in any further production of hydrogen gas beyond the equilibrium represented by Equation 1.

The heat cracking of a hydrocarbon and its reaction with water vapor is an endothermic reaction. The temperature of the reaction chamber 20 is maintained within it operational temperature range by the second combustion heater 23. When the power generation system 10 is first started, the first and second combustion heaters 22, 23 may directly burn the hydrocarbon fuel 16. However, once the components are up to temperature, both the first and second combustion heaters 22, 23 are fueled by hydrogen gas, as is later explained.

As an example, real numbers are herein applied to Equation 1. Referencing Equation 1, assume the primary hydrocarbon in the hydrocarbon fuel 16 is $C_8H_{18}$, such as the case with diesel fuel. Using Equation 1, the following water gas shift reaction occurs.

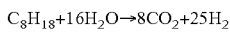

$$C_8H_{18} + 16H_2O \rightarrow 8CO_2 + 25H_2$$

It can therefore be seen that by combining the hydrocarbon fuel 16 with water vapor in the reaction chamber 20, a hydrocarbon containing only eighteen hydrogen atoms (H) results in reactant gases that include 25 free molecules of hydrogen gas ($H_2$).

The reaction chamber 20 is coupled to a hydrogen separator 24. The hydrogen separator 24 can be of many prior art designs. However, to optimize the efficiency of the overall system either a multi-channel hydrogen separator or a composite structure hydrogen separator is used. A multi-channel hydrogen separator is disclosed in co-pending U.S. patent application Ser. No. 11/097,535, entitled System And Method For Efficiently Separating Hydrogen Gas From A Mixed Gas Source, the disclosure of which is incorporated into this specification by reference. A composite structure hydrogen separator is disclosed in co-pending U.S. patent application Ser. No. 10/770,732, entitled Composite Structure For High Efficiency Hydrogen Separation And Its Associated Methods Of Manufacture And Use, the disclosure of which is also incorporated into this specification by reference. Both cited applications are commonly owned, by Power+Energy, Inc. of Ivyland Pa., the assignee herein.

The use of a multi-channel hydrogen separator is for large fuel cell systems, such as those that many be used on a navel ship. The use of a composite structure hydrogen separator is more adaptable to smaller systems, such as those found in automobiles.

Regardless to the selected hydrogen separator type, the hydrogen separator 24 receives the reactant gases from the reaction chamber 20. The reactant gases are the gases on the right hand side of Equation 1. The reactant gases received by the hydrogen separator are very hot and act to heat the hydrogen separator 24 to its operating temperature. The hydrogen separator 24 separates the hydrogen from the reactant gases. The hydrogen separator 24 has two outputs. One output 28 is for the hydrogen gas. The hydrogen gas is ultra pure, having a purity of at least 99.999%. The hydrogen separator 24 also has a raffinate gas output 29, which primarily passes $CO_2$.

Figure 2:
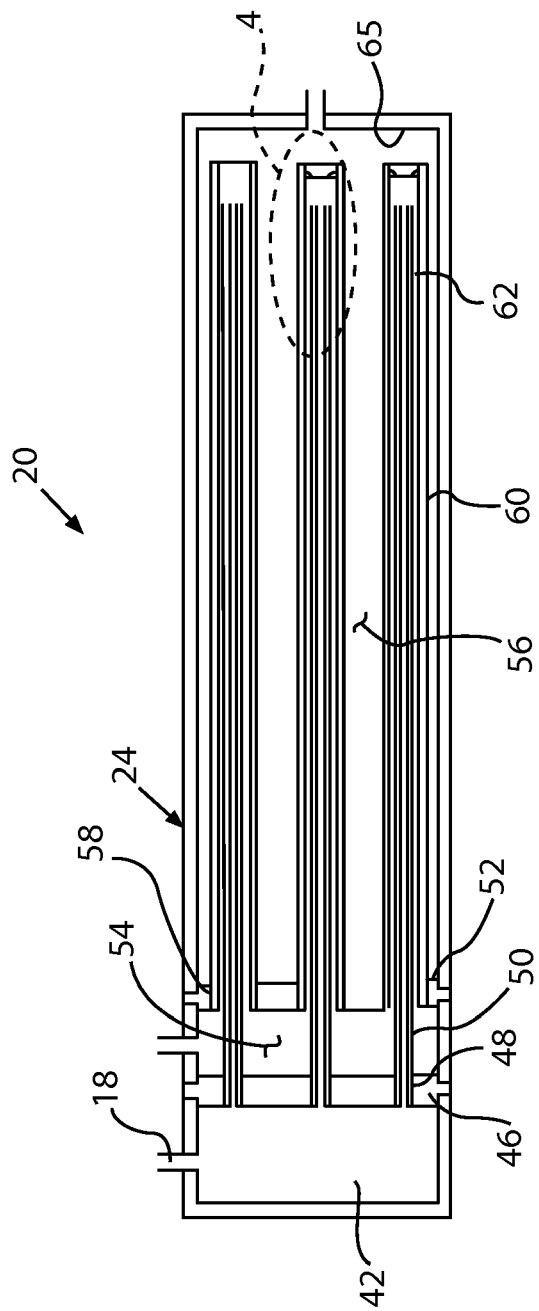
FIG. 2 is an exemplary embodiment of a multi-channel hydrogen separator.

Although both a multi-channel hydrogen separator and a composite structure hydrogen separator can be used, a micro-channel hydrogen separator is herein used as the illustrated exemplary embodiment. Referring to FIG. 2, an exemplary embodiment of a micro-channel hydrogen separator is shown. The micro-channel hydrogen separator has an enclosed housing 44. A plenum chamber 42 at disposed one end of an enclosed housing 44. The enclosed housing 44 is preferably made of stainless steel or another high strength alloy that is non-reactive to any of the component gases received from the reaction chamber.

The plenum chamber 42 is defined between the interior of the enclosed housing 44 and a first chamber wall 46. The first chamber wall 46 contains a plurality of holes 48 that are symmetrically arranged in a highly space efficient manner. The holes 48 are preferably spaced as densely as possible while still maintaining a predetermined minimum area of material around each of the holes 48.

A plurality of support tubes 50 extend from the first chamber wall 46. The support tubes 50 have solid walls with opposing open ends. The support tubes 50 are joined to the first chamber wall 46 at each of the holes 48. In this manner, the holes 48 directly communicate with the interior of the support tubes 50 and any gas flowing out of the plenum chamber 42 through the first chamber wall 46 must flow through the support tubes 50.

Although the exemplary embodiment shows only three support tubes 50 that communicate with the plenum chamber 42, it will be understood that hundreds may be present. The use of three is for simplicity of illustration.

The support tubes 50 have a length nearly as long as the interior of the enclosed housing 44. The support tubes 50 and the first chamber wall 46 are preferably made of the same non-reactive material as is the enclosed housing 44. In this manner, the first chamber wall 26, and the support tubes 30 have the same coefficient of thermal expansion as does the enclosed housing 44.

A second chamber wall 52 is disposed within the enclosed housing 44 at a point adjacent to the first chamber wall 46. The second chamber wall 52 creates two additional chambers within the enclosed housing 44 in addition to the plenum chamber 42. A waste gas collection chamber 54 is created between the first chamber wall 46 and the second chamber wall 52. Lastly, a hydrogen collection chamber 56 is created between the second chamber wall 52 and the second end of the enclosed housing 44.

The second chamber wall 52 defines a plurality of holes 58 that are slightly larger than the diameter of the support tubes 50 that are extending from the first chamber wall 46. The holes 58 in the second chamber wall 52 are aligned with the support tubes 50, thereby allowing the support tubes 50 to extend through the second chamber wall 52.

A plurality of hydrogen permeable tubes 60 are coupled to the second chamber wall 52. The hydrogen permeable tubes 60 are aligned with the holes 58 in the second chamber wall 52 and pass around the support tubes 50. It will therefore be understood that the hydrogen permeable tubes 60 are coaxially aligned with the support tubes 50 and surround the support tubes 50. The hydrogen permeable tubes 60 are preferably palladium or a palladium based alloy, such as a palladium/silver alloy. However, other hydrogen permeable alloys can also be used.

Figure 3:
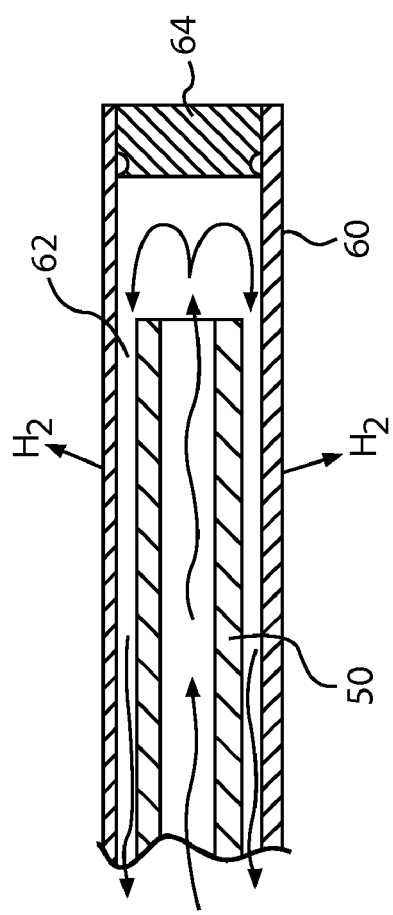
FIG. 3 is an enlarge view of the section of the multi-channel hydrogen separator shown in FIG. 2.

Referring to FIG. 3, it can be seen that a gap space 62 exists between the outside surface of the support tubes 50 and the inside surface of the hydrogen permeable tubes 60. The size of the gap space 62 is dependent upon the thickness of the walls of the hydrogen permeable tubes 60. Preferably, the size of the gap space 42 is between two times (2x) and fifty times (50x) the thickness of the wall that forms the hydrogen permeable tubes 60. The gap space 62 runs along the length of the support tubes 50 in the area that the hydrogen permeable tubes 60 overlap the support tubes 50.

The hydrogen permeable tubes 60 are longer than the support tubes 50 they surround. The free ends of the hydrogen permeable tubes 60 are closed. In the shown embodiment, an internal end cap 64 is internally brazed in place at the end of each of the hydrogen permeable tubes 60. The end caps 64 are preferably brazed to the inside of the hydrogen permeable tubes 60. In this manner, the end caps 64 do not restrict the hydrogen permeable tubes 60 from expanding outwardly when heated and saturated with molecular hydrogen.

Referring to FIG. 3 and FIG. 2, it will be understood that in operation, the enclosed housing 24 and all its contents are heated to an operating temperature in excess of 300 degrees Centigrade by the incoming gases from the reaction chamber. The gases from the reaction chamber are introduced into the plenum chamber 42. The gases fill the plenum chamber 42 and flows into the support tubes 50 through the first chamber wall 46. The gases exit the far ends of the support tubes 50 and are forced to flow through the gap spaces 62 that exists between the exterior of the support tubes 50 and the interior of the surrounding hydrogen permeable tubes 60. The gap space 42 drains into the waste gas collection chamber 54. However, as the gases flow through the gap space 62, the flowing gases spread thinly over the outside surfaces of the hydrogen permeable tubes 60. The length and width of the gap space 62, as well as the gas flow rate, are engineered to maximize the efficiency at which the hydrogen gas permeates through the hydrogen permeable tubes 60. By spreading the contaminated gas thinly over the surfaces of the hydrogen permeable tubes 60, the hydrogen contained within the reaction chamber gases doe not have to diffuse far before it contacts hydrogen permeable material. In this manner, a high percentage of the hydrogen available in the reaction chamber gases are provided with the opportunity to disassociate from the reaction chamber gases and pass through the hydrogen permeable tubes 60. Depending upon operating parameters, a hydrogen diffusion efficiency in excess of eighty percent can be achieved.

As hydrogen gas passes through the hydrogen permeable tubes 60, the hydrogen gas passes into the collection chamber 56 of the enclosed housing 44. The hydrogen gas in the collection chamber 56 is then drawn out of the collection chamber 56 for use. The hydrogen gas is ultra pure, being that only molecular hydrogen is capable of dissociating from the contaminated source gas and pass through the hydrogen permeable tubes 60.

The non-hydrogen components of the reaction chamber gases flow through the gap spaces 62 and into the waste gas collection chamber 54. The waste gas is then drawn out of the hydrogen separator through the raffient gas port 29.

Since the gases from the reaction chamber pass through the small gap spaces 62 between the hydrogen permeable tubes 60 and the support tubes 50, each of the gap spaces process micro volumes of gasses in the same manner. The gases from the reaction chamber are therefore uniformly managed, thereby enabling a vast majority of the hydrogen gas contained within those gases to be separated.

Since the gases from the reaction chamber pass through the plenum chamber 42 and the gap spaces 62 within the microchannel hydrogen separator, it should be understood that catalytic material can be placed in these areas. The catalytic material can be used to further crack lingering hydrocarbons, there by releasing more hydrogen gas.

Referring back to FIG. 1, it can be seen that the separated hydrogen gas is drawn away from the hydrogen separator 24 by a hydrogen blower 25. Since the purified hydrogen gas is drawn away, the hydrogen (H2) of the right hand side of Equation 1 never reaches chemical equilibrium. Since the partial pressure of hydrogen is reduced, a chemical equilibrium is not achieved across the water gas shift reaction of Equation 1. This causes the reaction of hydrocarbons and water to proceed to chemical exhaustion. By reacting nearly all the hydrocarbon molecules with water molecules, nearly all the chemical energy in the fuel is converted into extremely pure hydrogen. The Hydrogen can then be feed directly into the PEM fuel cell 14 in a dead ended manner.

The hydrogen blower 25 is used to both reduce the pressure of the hydrogen on the pure side of the hydrogen separator and also to pressurize the hydrogen to a few PSI when it is fed to the PEM fuel cell 14. The hydrogen blower 25 is powered by the PEM fuel cell 14. The energy gained by driving the water gas shift reaction to completion exceeds the energy lost to the hydrogen blower 25. Consequently, a net gain of energy is achieved.

From FIG. 1, it will be understood that ultra pure hydrogen from the hydrogen separator 24 is fed to the fuel cell 14. The fuel cell 14 receives the ultra pure hydrogen and oxygen from ambient air. The fuel cell 14 converts the ultra pure hydrogen and air into electricity and water ($H_2O$). Depending upon the type of fuel cell 14 being used, the volume of water created by the fuel cell 14 can exceed the volume of water 27 that is fed into the reaction chamber 20. Thus, the water produced by the fuel cell 14 can be used to replenish the water supply 26 and still excess clean water exists for use in other purposes.

The reaction chamber 20 can be heated in many ways. For instance, electrical power from the fuel cell 14 can be used to heat the reaction chamber 20. Alternatively, some of the hydrocarbon fuel 16 can be burned. However, one of the most efficient ways to heat the reaction chamber 20 is to burn some of the ultra pure hydrogen produced by the hydrogen separator 24.

The ultra pure hydrogen flowing out of the reaction chamber 20 to the fuel cell 14 can be tapped. A small percentage of that hydrogen gas can be mixed with air and fed into both the first combustion heater 22 and the second combustion heater 23. A reactant, such as palladium, can be present in the first and second combustion heaters 22, 23 to start a rapid oxidation reaction between the hydrogen and the air. As the hydrogen burns, it rapidly heats, thereby raising the temperature of the incoming water and the reaction chamber 20 to specified temperatures.

A small reserve 30 of ultra pure hydrogen can be maintained so that there is enough hydrogen gas present to initially heat the reaction chamber 20 upon start up. Such a reserve 30 is not needed if the hydrocarbon fuel 16 is initially used to heat the reaction chamber 20.

The combustion of the hydrogen gas in the combustion chambers 22, 23 results in water vapor and trace gases such as nitrogen ($N_2$). The water vapor can be recovered and recycled to the water supply 26. The trace gases can be vented to the surrounding atmosphere. The exhausts gases can also be used to preheat the incoming hydrocarbon fuel and/or water.

From the configuration of FIG. 1, the methodology of operation for the power generation system 10 can now be understood. A reaction chamber 20 is heated by burning hydrogen gas. Hydrocarbon fuel 16 and water 27 are introduced into the heated reaction chamber 20. The hydrocarbon fuel 16 and water 27 react, producing less complex resultant gases. The resultant gases are passed into a hydrogen separator 24. The hydrogen separator 24 separates hydrogen from the resultant gases. The hydrogen gas is drawn away from the hydrogen separator to prevent premature reaction equilibrium within the heated reaction chamber 20 or hydrogen separator. The separated hydrogen is used to both power the fuel cell 14 and heat the reaction chamber 20.

The fuel cell 14 produces water. Some of the water produced is used to replenish the water supply 26. The remaining water is for surplus use.

It will therefore be understood that the power generation system 10 takes ordinary hydrocarbon fuel 16 and converts some of that fuel into purified hydrogen gas. The purified hydrogen gas powers a fuel cell 14, that produces electricity. A standard hydrocarbon fuel 16 can therefore be used to power a fuel cell 14 in a highly space efficient, singe-stage process.

It will be understood that the embodiment of the fuel processor and the overall power generation system that is shown is merely exemplary and that a person skilled in the art can make many changes using functionally equivalent configurations. For example, the reaction chamber and the combustion compartment that heats the reaction chamber can have numerous configurations. Furthermore, many aspects of the hydrogen separator and the fuel cell are a matter of design selection. It will be further understood that an embodiment of the present invention can be made where a plurality of fuel processors and/or fuel cells are used together. All such variations, modifications and alternate embodiments are intended to be included within the present invention as defined by the claims.

What is claimed is:

1. A method of generating power, comprising the steps of:
providing a fuel cell that operates using hydrogen gas;
providing a hydrocarbon fuel;
reacting said hydrocarbon fuel with water vapor in a heated environment to produce heated reactant gases that include hydrogen gas;
providing a hydrogen separator containing a support tube and a hydrogen permeable tube that are coaxially aligned so that a gap space exists between said support tube and said hydrogen permeable tube;
passing said heated reactant gases through said gap space in said hydrogen separator, wherein said hydrogen gas permeates through said hydrogen permeable tube and separates from said reactant gases; and
supplying said hydrogen gas to said fuel cell, wherein said fuel cell produces power.

2. The method according to claim 1, wherein said fuel cell generates water when producing said power, and wherein said step of reacting said hydrocarbon fuel with water vapor in a heated environment includes recycling said water for introduction into said heated environment.

3. The method according to claim 1, further including heating said heated environment by burning some of said hydrogen gas.

4. The method according to claim 1, further including the step of heating said heated environment to a temperature in excess of 600° C.

5. The method according to claim 1, wherein said step of providing a hydrocarbon fuel includes providing a hydrocarbon fuel selected from a group consisting of petrochemicals, alcohols, ammonia, propane, and natural gas.

6. The method according to claim 1, wherein said step of reacting said hydrocarbon fuel with water vapor includes inducing the reaction $C(n)H(m)+2(n)H_2O=(n)CO_2+[2(n)+(m/2)]H_2$, where $C(n)H(m)$ is said hydrocarbon fuel, $H_2O$ is said water vapor, (n) is the number of carbon atoms in said hydrocarbon fuel and (m) is the number of hydrogen atoms in said hydrocarbon fuel.

7. The method according to claim 1, further including actively drawing said hydrogen gas out of said hydrogen separator using a hydrogen blower.

* * * * *